(12) United States Patent
Fildebrandt

(10) Patent No.: US 8,126,961 B2
(45) Date of Patent: Feb. 28, 2012

(54) INTEGRATION OF CLIENT AND SERVER DEVELOPMENT ENVIRONMENTS

(75) Inventor: Ulf Fildebrandt, Oftersheim (DE)

(73) Assignee: SAP AG, Walldorf (DE)

( * ) Notice: Subject to any disclaimer, the term of this patent is extended or adjusted under 35 U.S.C. 154(b) by 915 days.

(21) Appl. No.: 11/780,288

(22) Filed: Jul. 19, 2007

(65) Prior Publication Data

US 2009/0024696 A1 Jan. 22, 2009

(51) Int. Cl.
*G06F 15/16* (2006.01)
(52) U.S. Cl. ........................................ 709/203
(58) Field of Classification Search .................. 709/205, 709/203
See application file for complete search history.

(56) References Cited

U.S. PATENT DOCUMENTS

| | | | | |
|---|---|---|---|---|
| 6,868,454 B1* | 3/2005 | Kubota et al. | | 709/237 |
| 2002/0066071 A1* | 5/2002 | Tien et al. | | 717/102 |
| 2003/0217100 A1* | 11/2003 | Kronk | | 709/203 |
| 2006/0167981 A1* | 7/2006 | Bansod et al. | | 709/203 |
| 2007/0061739 A1* | 3/2007 | Stulski | | 715/760 |
| 2007/0073851 A1* | 3/2007 | Baikov et al. | | 709/220 |
| 2007/0220035 A1* | 9/2007 | Misovski | | 707/102 |
| 2008/0126932 A1* | 5/2008 | Elad et al. | | 715/705 |
| 2008/0222606 A1* | 9/2008 | Solirov et al. | | 717/122 |

* cited by examiner

*Primary Examiner* — Krisna Lim
(74) *Attorney, Agent, or Firm* — Mintz Levin Cohn Ferris Glovsky and Popeo, P.C.

(57) ABSTRACT

Methods and apparatus, including computer program products, related to integration of client and server development environments. A message may be caused to be sent to a server development environment engine where the message characterizes an action mapped from a client development environment to a function of the server development environment engine. Another message characterizing an event of the server development environment engine may be received where that message is to cause the client development environment to resolve the event. The messages may be used to integrate the client and server development environments by providing a path of communication by which the server development environment engine may provide services to a client development environment that integrates the service in a user interface of a client development environment engine.

17 Claims, 3 Drawing Sheets

INTEGRATION OF CLIENT AND SERVER DEVELOPMENT ENVIRONMENTS

BACKGROUND

The present disclosure relates to integration of client and server development environments.

In general, development environments are used to develop application programs, also referred to as applications. Development environments may include one or more tools, and multiple tools may be combined to provide an integrated development environment that may provide a single point from which an application may be developed. Examples of integrated development environments include SAP's VISUAL COMPOSER and NETWEAVER DEVELOPER STUDIO. Development environments may have a development engine that manages one or more tools of the development environments. For example, a development engine may manage presenting a user interface of tools to a user and manage compiling a project to produce a run-time version of an application. Development environments may be referred to as being client-based or server-based, depending on features of the development environments. For example, a development environment that has a development engine that runs on a server and interacts with a client application to provide a user interface to an end-user may be referred to as a server development environment. As another example, development environment that has a development environment engine that runs on a same computer platform that presents a user interface to a user may be referred to as a client development environment.

SUMMARY

The subject matter disclosed herein provides methods and apparatus, including computer program products, that integrate client and server development environments.

In one aspect, a first message is caused to be sent to a server development environment engine and a second message characterizing an event of the server development environment engine is received. The first message characterizes an action mapped from a client development environment to a function of the server development environment engine and the second message is to cause the client development environment to resolve the event.

In another aspect, a user interface of a development environment is to be presented at a client, a first development environment engine is to be deployed at a client, and an interface is to cause messages to be sent and received to and from the development environment. The first development environment engine presents features of a second development environment engine of a server in the user interface. The interface may cause a first message to be sent to the second development environment engine and the interface may receive a second message characterizing an event of the second development environment engine. The first message may characterize an action mapped from the development environment to a function of the server development environment engine and the second message may cause the development environment to resolve the event.

The subject matter may be implemented as, for example, computer program products (e.g., as source code or compiled code), computer-implemented methods, and systems.

Variations may include one or more of the following features.

Resolving events may include performing an action in response to the event if the action is to be performed in response to the event. Resolving events may include not performing an action.

In a client development environment, a server development environment for user interface patterns of a server development environment engine may be presented, where the server development environment engine executes on a server system.

Data characterizing user input may be received. The user input may include interactions with a user interface pattern. The data may be translated to one or more messages to be sent to a server development environment engine.

Data characterizing a service being developed in a client development environment may be received. An instance of the service may be generated at a client development environment compiler. A graphical representation of the service may be presented in a window of the client development environment and a user interface pattern may be presented in the window. Data characterizing user input linking the user interface pattern with the graphical representation of the service may be received. A message may be caused to be sent to the server development environment engine to generate an application comprising a connection between a user interface based on the user interface pattern and the service.

A message may characterize an action to persist an application being modeled at a server development environment engine. Another message may characterize a notice that the application was successfully persisted.

The second message may be sent in response to the first message.

The server development environment engine may perform the function.

The subject matter described herein can be implemented to realize one or more of the following advantages. Client and server development environments may be integrated at a client such that a client may have a common interface for application development. The common interface may provide for an easier workflow and may make use of a development environment simpler. For example, multiple applications for multiple development environments need not be started on an end-user computer. As another example, user interface controls for a development environment may be mapped to similar functions across client and server development environment tools such that a user need not be familiar with multiple environments. As another example, a user need not switch back and forth between development environments. The client and server development environments may each have distinct aspects such that when combined, a more complete synthesis of applications is attainable from a single environment. For example, a code-free application modeling environment such as VISUAL COMPOSER may be combined with a code-based application development environment such as NETWEAVER DEVELOPER STUDIO such that the benefits of code-free application development may be combined with the freedom of source code-based application development. For example, a component may be customized in tools similar to those of NETWEAVER STUDIO and imported into tools similar to those of VISUAL COMPOSER in a common development environment. As another example, services may be generated in tools similar to those of NETWEAVER STUDIO and user interfaces for the services may be generated in tools similar to those of VISUAL COMPOSER. The generation of components with specialized tools of different development environment engines may facilitate development of composite applications.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
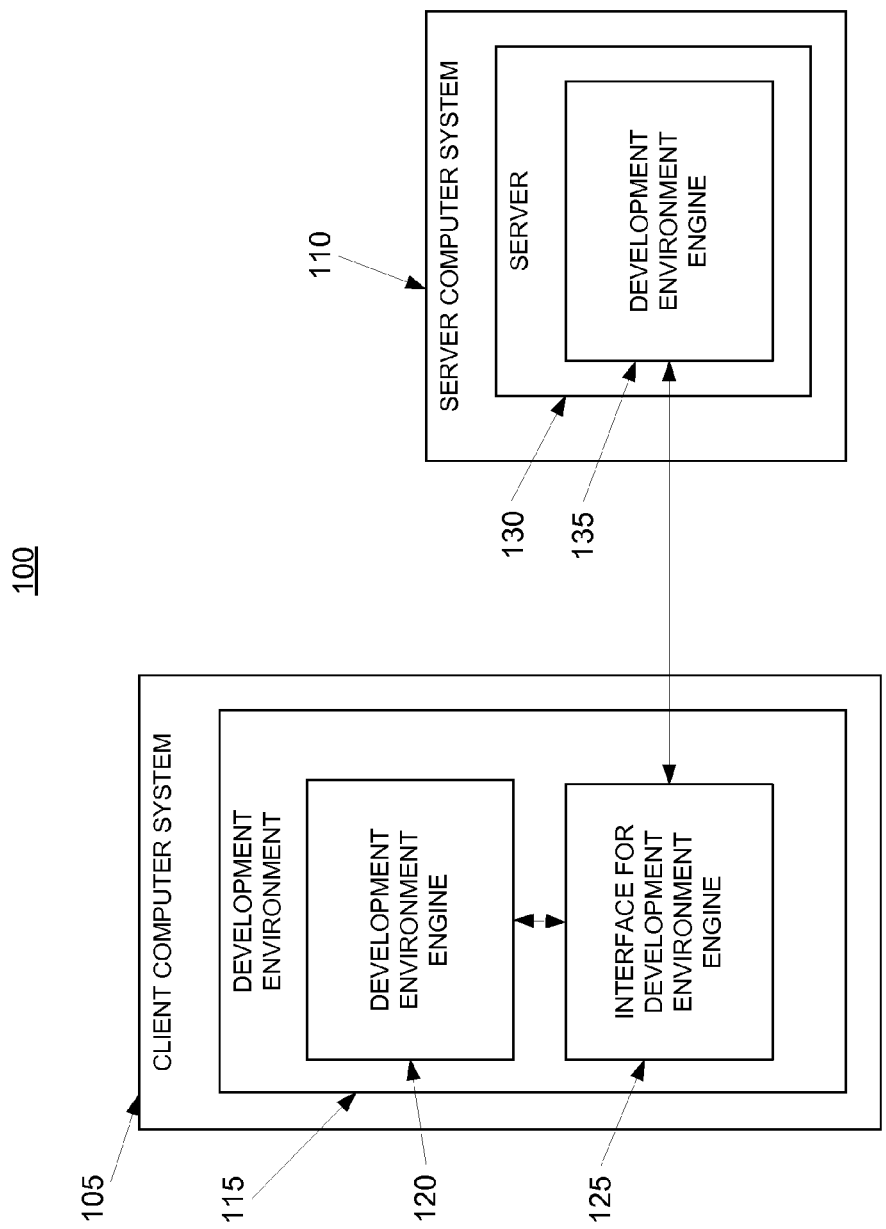
FIG. 1 is a block diagram of a system landscape including an integration of client and server development environments.

FIG. 1 is a block diagram of a system landscape 100 including an integration of client and server development environments. In general, the system landscape 100 includes a client computer system 105 and a server computer system 110. The client computer system 105 includes a development environment 115, which includes a development environment engine 120 and an interface for a development environment engine 125. The server computer system 110 includes a server 130, which includes a development environment engine 135.

In general, client and server development environments are integrated in the system landscape 100 in a client development environment 115. The integration is assisted by the interface for a development environment engine 125. The interface 125 communicates with the development environment engine 135 through messages such that services of the development environment engine 135 may be integrated in the development environment 115. Messages may include remote function calls, application to application messages (e.g., messages sent in accordance with the SIMPLE OBJECT ACCESS PROTOCOL), and the like. For example, the messages may communicate events of the development environment engine 135 and communicate requests for actions to be performed at the development environment engine 135.

For example, the development environment engine 135 may have an event that indicates a model of an application was successfully deployed, and, a message may be sent from the development environment engine 135 to the interface 125. The interface 125 may resolve the event by determining to generate a dialog box in the development environment 115 to notify an end-user that the model was successfully deployed. As another example, an end-user of the development environment 115 may drag and drop a pattern from a list of patterns to a drafting area to generate an instance of a pattern. To generate the instance of the pattern, the development environment engine 120 may communicate with the interface 125 to cause a message to be sent to the development environment engine 135 to request the instance of the pattern be generated.

Some tools of the development environment 115 may be managed by the development environment engine 120. For those tools, the development environment engine 120 may handle all tasks.

In general, the client and server development environment engines 120, 135 manage development of applications or components of applications, which may include providing tools to model applications or application components in accordance with a programming paradigm (e.g., a drafting area for visual modeling of applications in accordance with the model-view-controller paradigm, similar to VISUAL COMPOSER), source code editing tools (e.g., a text-editor for drafting code), compiling tools, and debugging tools.

Each of the client and server development environment engines 120, 135 may be used to develop various applications or application components that may be combined in the development environment 115 to generate an application, which may be referred to as a composite application. And, each of the client and server development environment engines 120, 135 may provide various benefits and advantages that, when combined, provide additional benefits. For example, tools managed by the server development environment engine 135 may include a visual modeling environment tool that allows for patterns to be combined in a code-free environment to generate applications (e.g., similar to VISUAL COMPOSER), which may be preferable for generating user interfaces. And, tools of the client development environment engine 120 may provide for source-code level development, including development of application services that may be offered by a server. When integrated in the development environment 115, through a common interface, a user may effortless create applications using the visual modeling environment and generate additional services, if desired, using source-code editing tools.

In addition to integrating management of the client and server development environment engines 120, 135, the client development environment 115 may provide a single user interface from which tools of each of the development environment engines may be accessed. Different granularities of user interface integration may be achieved. For example, a tool may integrate development of a same component across each environment. For example, a tool of the server development environment engine 135 may allow for patterns of the server development environment engine 135 to be drilled-down from a visual modeling environment to a source-code level (e.g., drilling down a pattern in a visual modeling tool of the server development environment engine 135 may cause a source code editing tool of the client development environment engine 120 to be used to edit the pattern). For example, a component generated with source code editing tools of the development environment engine 120 may be opened in a visual modeling tool of the server development environment engine 135 and those components may be combined with other components to generate an application deployed by the server development environment engine 135. As another example, a tool may be integrated across the development environment engines 120, 135. For example, a drafting tool may combine patterns from each of the development environment engines 120, 135.

Although FIG. 1 includes a separation between a client computer system 105 and a server computer system 110, such a division need not exist. For example, the server 130 may run on a same computer system as the development environment 115. In general, the terms client and server may refer to client and server application programs, although, they may refer to client and server computer systems. A client and server are generally remote from each other and typically interact through a communication network; however, a client and server need not have a dedicated connection. The relationship of client and server may arise by virtue of one computer program providing a service to another computer program.

As discussed above, a development environment may be a client or server development environment, in general, depending on whether a development engine connects to a client application to provide a user interface to an end-user. Implementations may vary from the implementation described with reference to FIG. 1. For example, a rich-client that manages development tools on a server may be considered a server development environment. The existence of server connectivity does not necessarily imply a server development environment. For example, a client development environment may include a help tool that connects to a knowledge database at a server to provide up-to-date technical help to an end-user.

Figure 2:
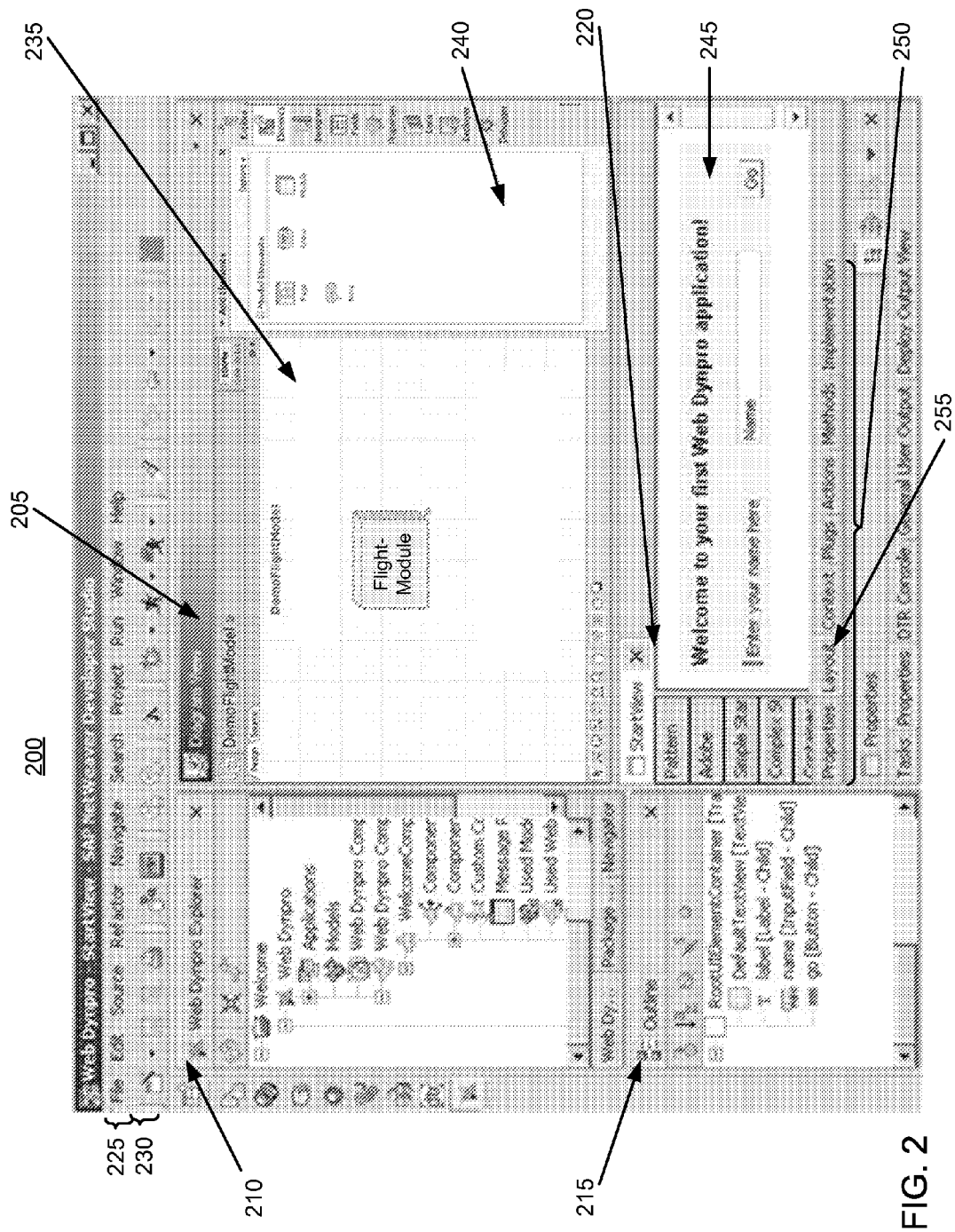
FIG. 2 is an illustration of a development environment with integration of features from client and server development environment engines.

FIG. 2 is an illustration of a development environment 200 with integration of features from client and server development environment engines. The development environment 200 is an integrated development environment that includes a variety tools that may be used to generate applications or application components. For example, the development environment 200 includes a visual modeling environment drafting tool 205, a project management explorer 210, and tools to edit a view 215, 220.

The tools are integrated in the development environment 200 such that tools are provided by a client and server development environment engine in a common interface, and components of applications generated from some tools may be imported into other tools. In particular, a division of the support of the tools may include a client development environment engine supporting the project management explorer 210 and the tools to edit a view 215, 220; and, a server development environment engine supporting the visual modeling environment drafting tool 205. A common interface may include, for example, providing the tools in a common window, and support of the menu bar 225 and tool buttons 230 across tools supported by either the client or server development environment engine. For example, the menu bar 225 and tool buttons 230 may be used for tools that are provided by either a client or server development environment engine. For example, a save option under a file menu pull-down list may be used to save an application developed using the visual modeling environment drafting tool 205. Integration of application components may include the client environment engine tools being able to generate components that may be imported into the visual modeling environment drafting tool 205 such that the components may become part of an application deployed by the visual modeling environment drafting tool 205.

For example, a view may be developed in a view editor tool 220, and compiled by an underlying client development environment engine. The compiled view may be imported into the visual modeling environment drafting tool 205, where it may be combined with other views and data services to model an application. Then, an underlying server development environment engine may be used to deploy the application.

To integrate the tools in a common interface, messages from a server development environment engine to a client development environment (e.g., a client development environment engine or an interface to the client development environment engine) may be used to communicate a state of the server development environment engine and messages to the server development environment engine from the client development environment may be used to send requests for actions to be performed by the server development environment. For example, messages to the server may cause functions of the server development environment engine to be invoked and messages from the server development environment engine may reflect events of the server development environment engine. For example, a save option of the menu bar 225 may be mapped to a function to persist data at a server development environment engine for server-based tools (e.g., and the same option may perform a save for components developed by a client development environment engine).

In general, the visual modeling environment drafting tool 205 is a visual modeling tool that may be used to model an application in accordance with a model-view-controller paradigm. The drafting tool includes a drafting area 235, and a collection of patterns 240. Patterns from the collection of patterns 240 may be dragged and dropped into the drafting area 235 to generate instances of patterns, and, instances of patterns may be connected (e.g., to generate data flows) and configured in the drafting area 235. An application modeled in the drafting area 235 may be deployed (e.g., including compiling) by a server development environment engine. Patterns may be developed and generated in client development environment tools and imported into the drafting area 235 to be used with applications developed in the drafting area 235.

The project management explorer 210 may provide a hierarchical view of development of applications and application components developed using client development engine tools. In some implementations, the project management explorer 210 may be integrated with server environment engine tools, such as the visual modeling environment drafting tool 205, such that a hierarchical view may be provided for applications and application components developed using client and server environment engine tools.

The view explorer tool 215 may provide a hierarchical view of components of a view being developed. For example, the view explorer tool 215 may provide a hierarchical view of components modeled in the view editor tool 220.

The view editor tool 220 allows an end-user to develop view patterns that may become an application component. In general, a view may be a user interface element of an application modeled in accordance with the model-view-controller paradigm. The view editor tool 220 includes a drafting area 245 that may be used to arrange a layout and configure user interface elements of a view (e.g., text fields and text may be arranged and configured). The tabs 250 show a variety of aspects of a view that may be configured. For example, the layout tab 255 is selected as the drafting area 245 is presented such that a layout may be configured.

Although a certain number and type of tools are illustrated in the development environment 200, integrated development environments that integrate features from client and server development environment engines may include additional, fewer, or different tools. For example, a text editor may be a client development environment engine tool.

Although certain tools of the development environment 200 are supported by a client and server development engine, a division of support may vary. For example, the visual modeling environment drafting tool 205 may be supported by a client development environment engine. Also, any number of development environment engines may be integrated. For example, multiple server development environment engines, each of which supports different tools, may be integrated in a client development environment.

Although the development environment 200 includes an integration of tools that may be used to generate different components to be deployed from a client and server development environment separately, additional or different techniques of integration may be implemented. For example, the server environment engine drafting tool 205 may allow for instances of view patterns to be edited using tools of the client environment engine.

Figure 3:
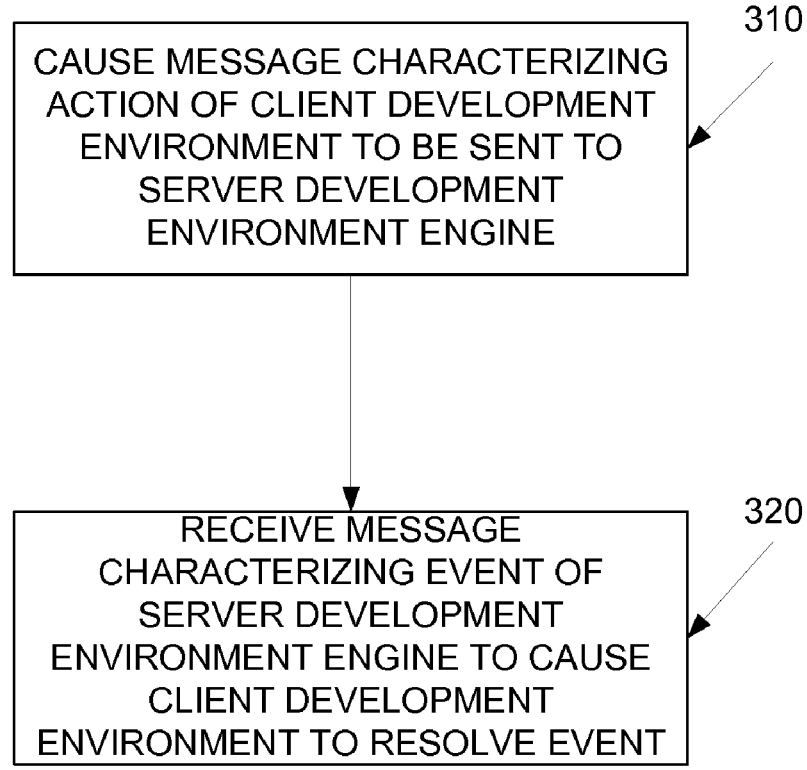
FIG. 3 is a flowchart illustrating a process of integrating client and server development environments.

FIG. 3 is a flowchart illustrating a process 300 of integrating client and server development environments. In general, client and server development environment engines of client and server development environments are integrated through messages. The messages may communicate status, requests for action, and the like to and from a server development environment engine. The process 300 may be implemented in the system landscape 100 of FIG. 1 to provide a development environment such as the development environment 115 of FIG. 1 or the development environment 200 of FIG. 2. For example, the interface 125 of FIG. 1 may generate and receive messages to and from the server development environment engine 135 to integrate features of the server development environment engine 135 in the client development environment 115.

A message characterizing an action of client development environment is caused to be sent to server development environment engine (310). Such a message may be a remote function call, application to application message (e.g., messages sent in accordance with the SIMPLE OBJECT ACCESS PROTOCOL), and the like. An action may be click of a button (e.g., a menu button or a request for context information of an item), a modification of source code, a configuration of a component being developed (e.g., a selection from a pull-down menu), and the like. A message may be sent in response to an action but need not be caused to be sent because of an action. For example, a message characterizing an action or series of actions may be sent in time intervals or as batches. The message may cause an action to be performed at a server development environment engine. For example, a message may request that an instance of a pattern be generated and the pattern may be generated in a workspace of the server development environment engine.

A message characterizing an event of a server development environment engine to cause a client development environment to resolve event may be received (320). For example, a server may send a status message indicating that a pattern was successfully generated in a visual modeling tool. The client development environment may resolve the event by displaying the instance of the message in a user interface of the tool. Resolving an event may include determining to perform no action.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in a computer-readable, non-transitory medium, the computer program product being operable to cause data processing apparatus to perform operations comprising:

causing a first message to be sent to a server development environment engine on a server computer system, the first message characterizing an action mapped from a client development environment to a function of the server development environment engine; and receiving a second message characterizing an event of the server development environment engine, the second message to cause the client development environment to resolve the event.

2. The product of claim 1, wherein the second message to cause the client development environment to resolve the event comprises:
the client development environment to perform the action in response to the event if the action is to be performed in response to the event.

3. The product of claim 1, the operations further comprising:
presenting, in the client development environment, a server development environment for user interface patterns of the server development environment engine, the server development environment engine executing on a server system.

4. The product of claim 1, the operations further comprising:
receiving data characterizing user input, the user input comprising interactions with a user interface pattern;
translating the data to one or more messages to be sent to the server development environment engine.

5. The product of claim 1, the operations further comprising:
receiving data characterizing a service being developed in the client development environment;
generating an instance of the service at a client development environment compiler;
presenting a graphical representation of the service in a window of the client development environment;
presenting a user interface pattern in the window;
receiving data characterizing user input linking the user interface pattern with the graphical representation of the service; and
causing a message to be sent to the server development environment engine to generate an application comprising a connection between a user interface based on the user interface pattern and the service.

6. The product of claim 1, wherein
the first message characterizes an action to persist, on the server computer system, an application being modeled at the server development environment engine; and
the second message characterizes a notice that the application was successfully persisted on the server computer system.

7. The product of claim 1, wherein the second message is in response to the first message.

8. The product of claim 1, the operations further comprising:
the server development environment engine performing the function.

9. The computer program product of claim 1, wherein the client development environment is executed on a client computer system.

10. A computer-implemented method comprising:
causing a first message to be sent to a server development environment engine on a server computer system, the first message characterizing an action mapped from a client development environment on a client computer system to a function of the server development environment engine; and
receiving a second message characterizing an event of the server development environment engine, the second message to cause the client development environment to resolve the event.

11. The method of claim 10, further comprising:
presenting, in the client development environment, a server development environment for user interface patterns of the server development environment engine, the server development environment engine executing on a server system.

12. The method of claim 10, further comprising:
receiving data characterizing user input, the user input comprising interactions with a user interface pattern;
translating the data to one or more messages to be sent to the server development environment engine.

13. The method of claim 10, further comprising:
receiving data characterizing a service being developed in the client development environment;
generating an instance of the service at a client development environment compiler;
presenting a graphical representation of the service in a window of the client development environment;
presenting a user interface pattern in the window;
receiving data characterizing user input linking the user interface pattern with the graphical representation of the service; and
causing a message to be sent to the server development environment engine to generate an application comprising a connection between a user interface based on the user interface pattern and the service.

14. The method of claim 10, wherein
the first message characterizes an action to persist, on the server computer system, an application being modeled at the server development environment engine; and
the second message characterizes a notice that the application was successfully persisted on the server computer system.

15. The method of claim 10, wherein the second message is in response to the first message.

16. The method of claim 10, further comprising:
the server development environment engine performing the function.

17. The method of claim 10, wherein the second message to cause the client development environment to resolve the event comprises:
the client development environment to perform the action in response to the event if the action is to be performed in response to the event.

* * * * *